Figure 1:
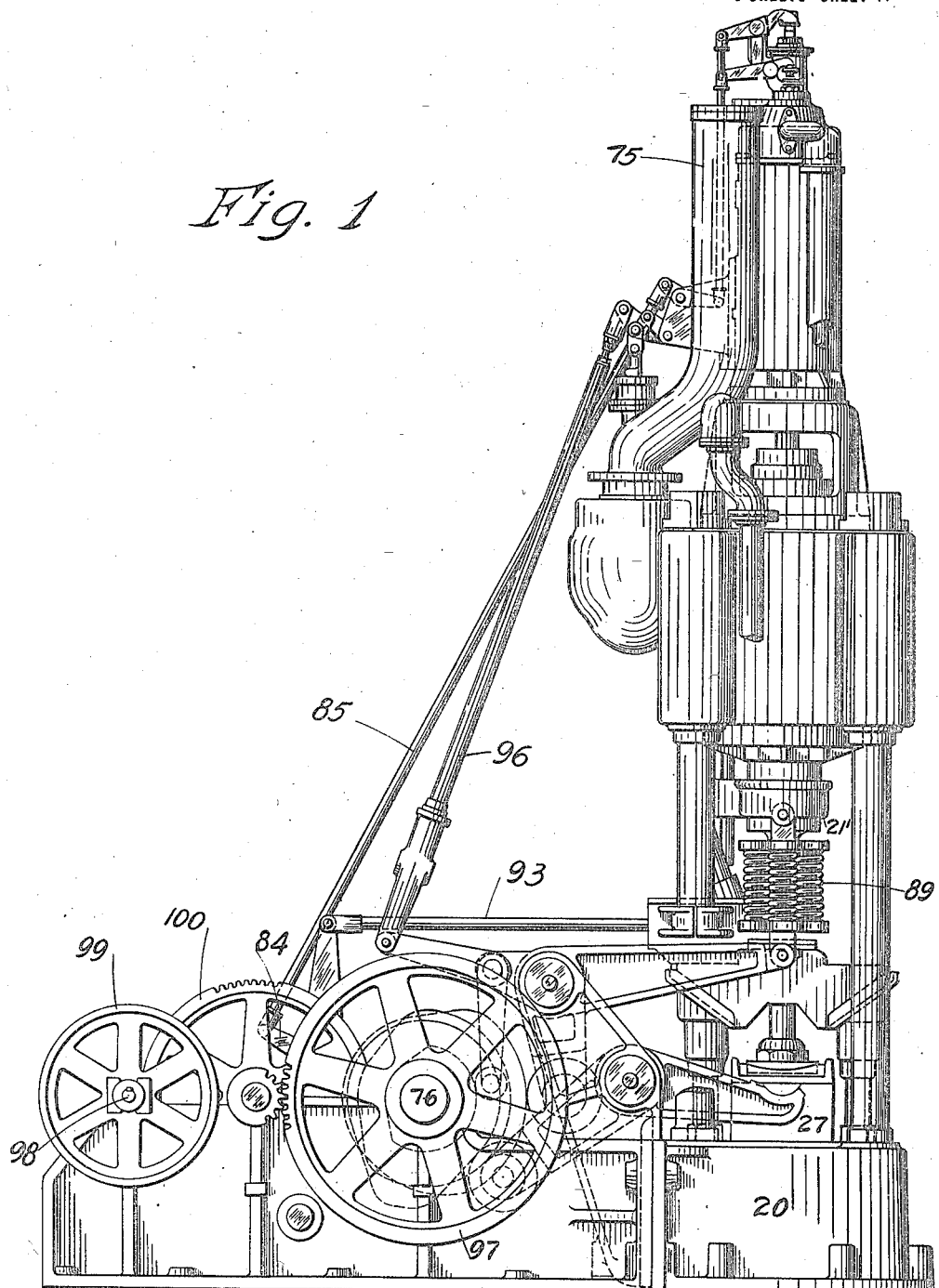

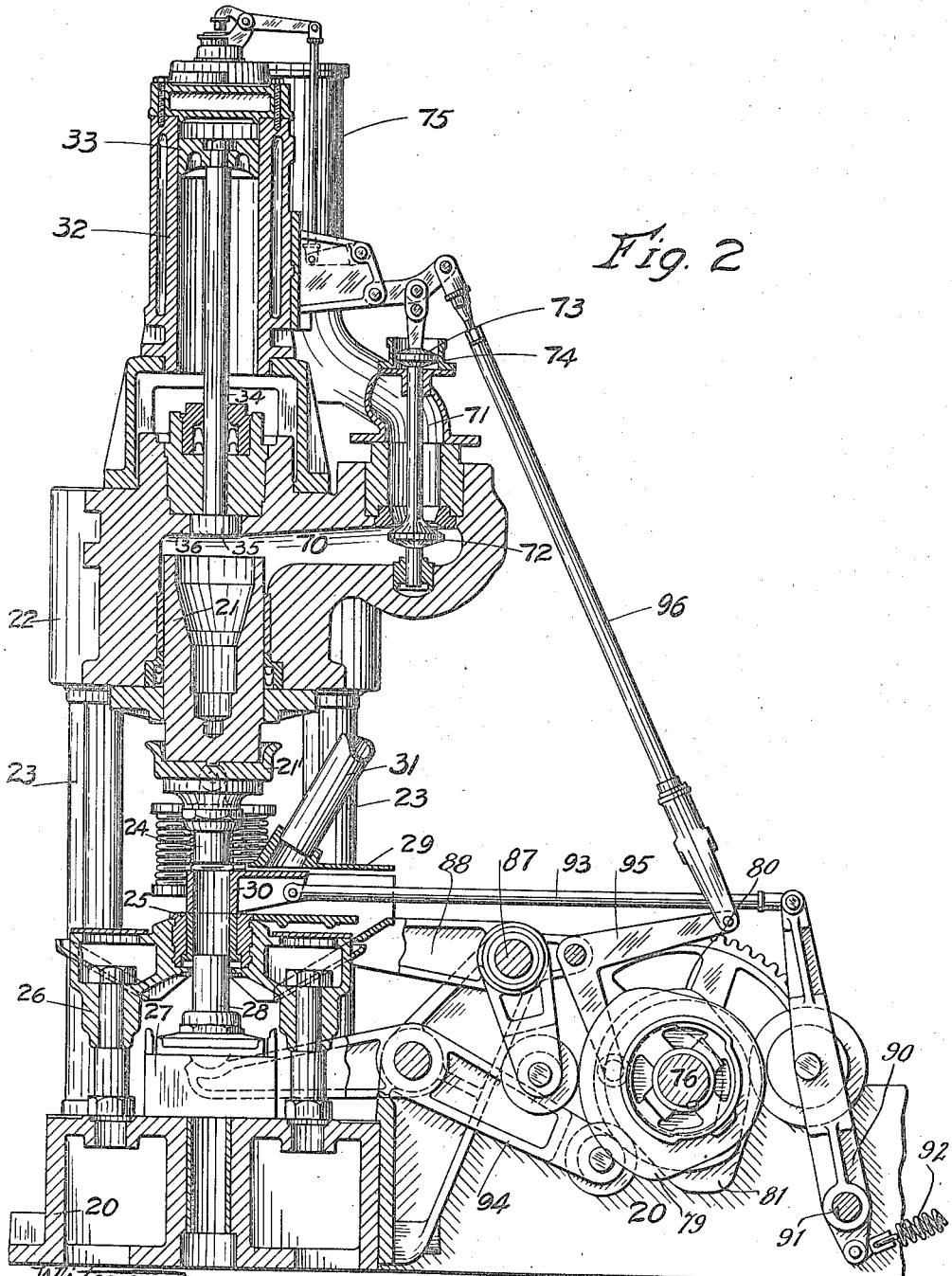

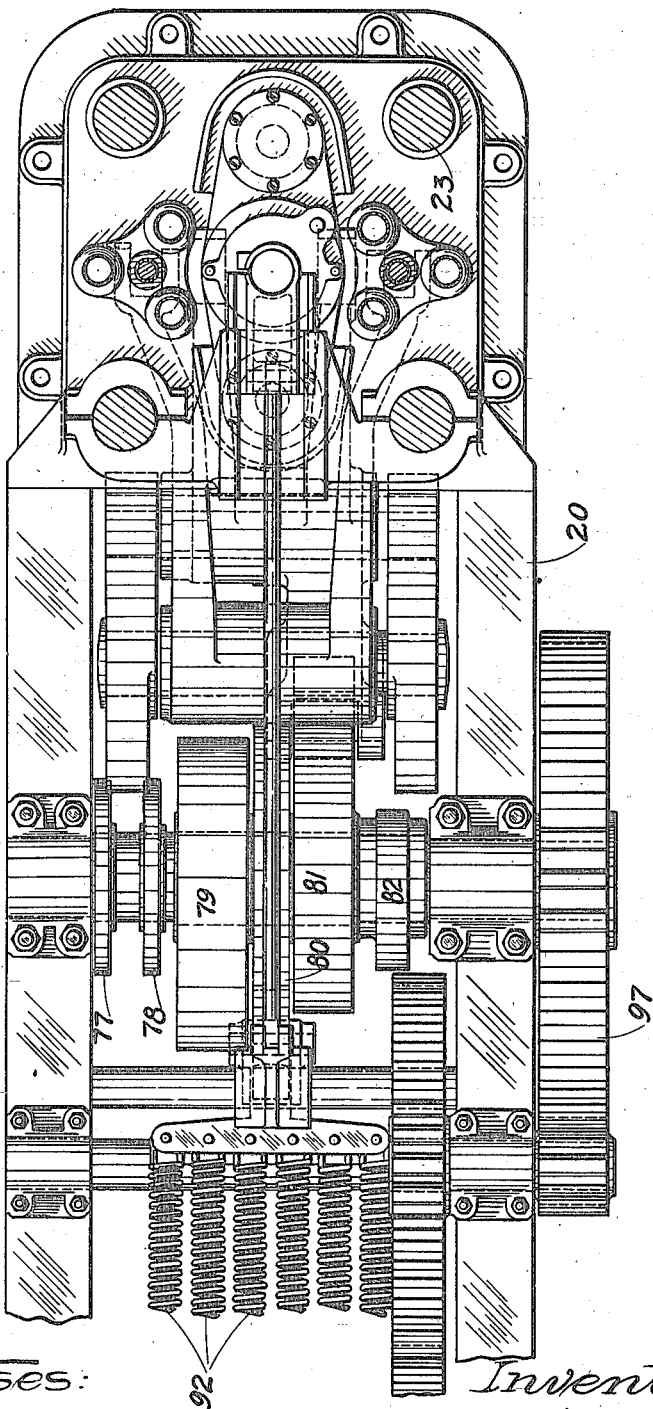

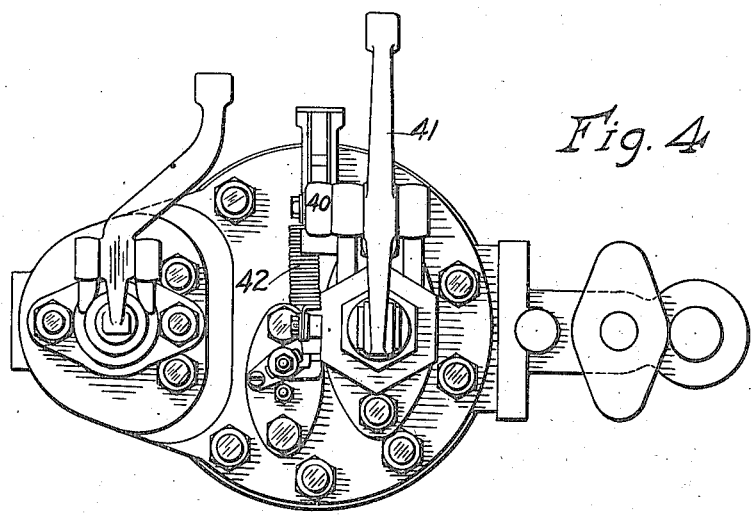
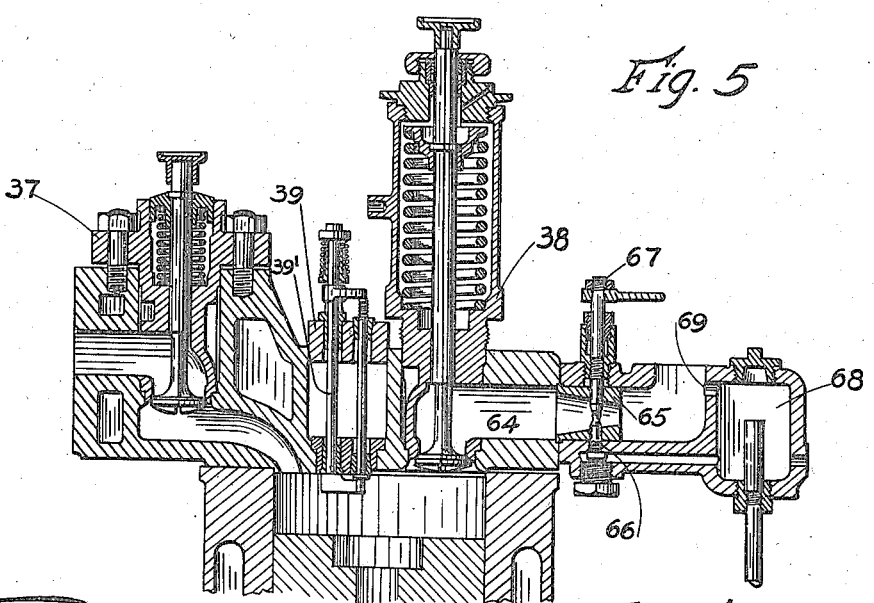

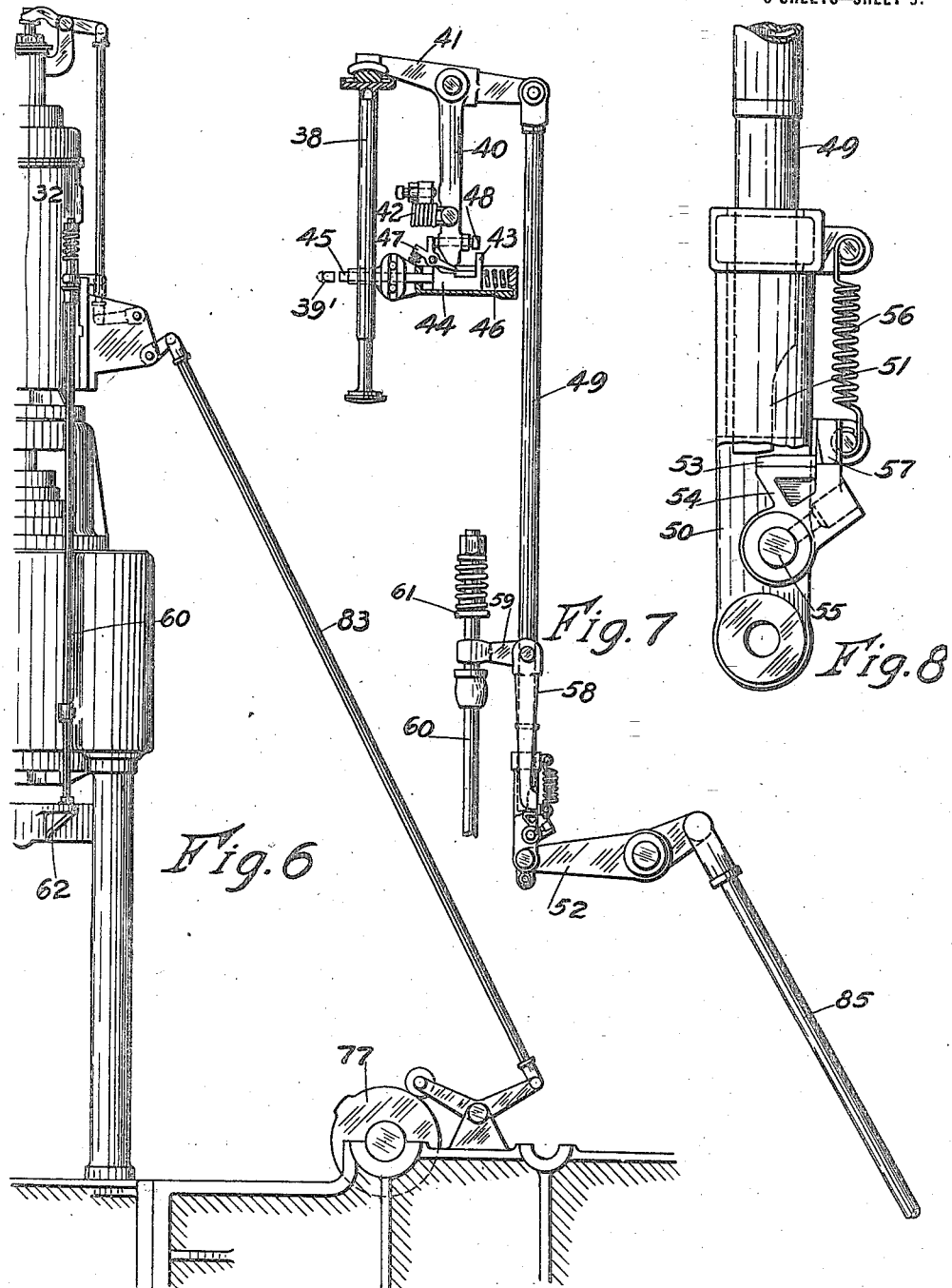

O. C. DURYEA.
BRIQUETING PRESS.
APPLICATION FILED DEC. 5, 1916.
1,220,733.
Patented Mar. 27, 1917.
6 SHEETS—SHEET 6.
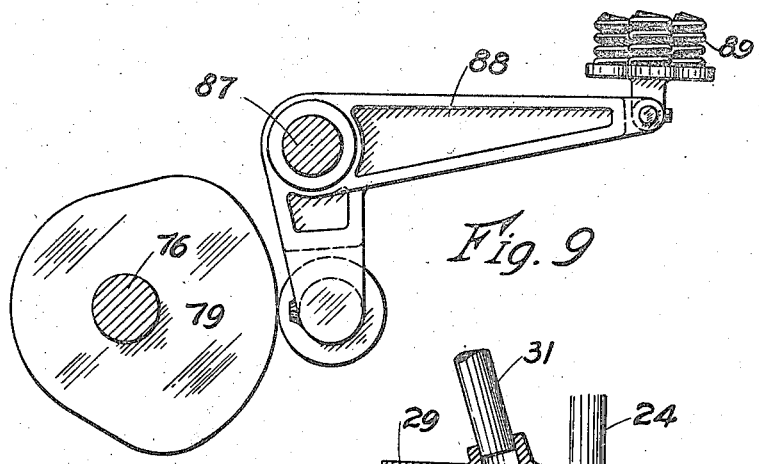
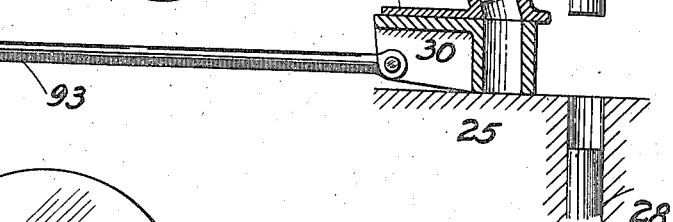
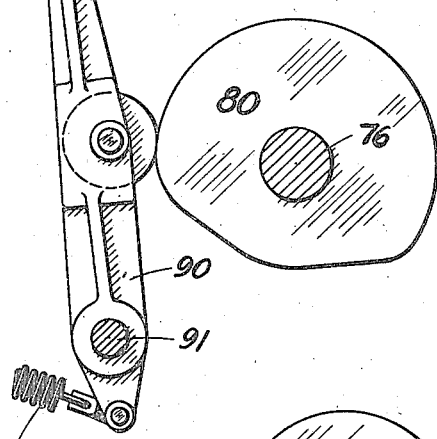
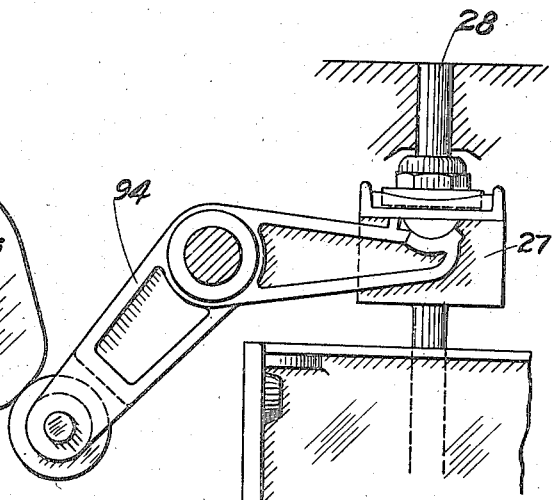
Witnesses:
Chas. H. Buell
F. A. Howard
Inventor:
Otho C. Duryea,
By Dyrenforth, Lee, Chritton and Wiles
Attys.

UNITED STATES PATENT OFFICE.

OTHO C. DURYEA, OF CHICAGO, ILLINOIS, ASSIGNOR TO AMERICAN BRIQUETTE MACHINE CO., OF HURON, SOUTH DAKOTA, A CORPORATION OF SOUTH DAKOTA.

BRIQUETING-PRESS.

1,220,733.  Specification of Letters Patent.  Patented Mar. 27, 1917.

Application filed December 5, 1916. Serial No. 135,153.

*To all whom it may concern:*

Be it known that I, OTHO C. DURYEA, a citizen of the United States, residing at Chicago, in the county of Cook and State of Illinois, have invented a new and useful Briqueting-Press, of which the following is a specification.

My invention relates to certain new and useful improvements in briqueting presses, and will be fully understood from the following detailed description of one specific embodiment thereof and from the drawings accompanying and forming a part of the same. In these drawings Figure 1 is a side elevation of my improved press; Fig. 2 is a central vertical section through the same; Fig. 3 is a section through the supporting pillars for the briqueting cylinder, showing the frame of the machine in plan; Fig. 4 is a plan view of the cylinder-head; Fig. 5 is a vertical section through the cylinder-head; Fig. 6 is a diagrammatic view in side elevation, showing the operating mechanism for the inlet valve and sparker; Figs. 7 and 8 are views showing the parts of this same mechanism and their relations; Fig. 9 is a diagrammatic view showing the cam and rocker-arm for elevating the plunger; Fig. 10 is a diagrammatic view showing the cam and rocker-arm for operating the feeder-valve or charge carrier; and Fig. 11 is a diagrammatic view showing the cam and rocker-arm for moving the lower anvil.

Referring more particularly to the drawings, the numeral 20 designates the base of the press which, as shown in Figs. 1 and 2, is a generally rectangular two-piece casting, one section of which serves to support the cam-shaft and its connected gearing and the other section of which supports the briqueting ram. The latter member is clearly illustrated in Fig. 2, and is in the form of a vertically reciprocable ram plunger, designated 21, operating within a suitable bore in the lower end of a cylinder-casting 22, carried by four vertical columns 23 secured to the base 20. The outer end of the ram 21 has secured thereto the briqueting plunger proper, designated 24, which is adapted to operate in a die or briquet mold 25 supported above the base 20 as by the columns or studs 26. A block 27 is mounted for vertical reciprocation below the die 25 and carries an upwardly projecting plunger 28 which forms the bottom of the die or mold and which I distinguish by the term anvil. It will be seen that the anvil 28 is supported by the block 27 and that the latter in its lower position rests directly upon the base casting 20, so that the anvil transmits the force of compression to which it is exposed in operation directly to the base of the machine. Just above and to one side of the die or mold 25 there is mounted a horizontally bored casing 29, within which the charge-carrier or feeding-valve 30 reciprocates horizontally. An upwardly and outwardly inclined hollow boss adjacent the inner end of the casing 29 serves to secure a feed-pipe 31 which leads upwardly to a suitable hopper or reservoir (not shown) containing the material to be briqueted. The feeding-valve 30 is provided with a skirt which covers the aperture of the feeding-boss when the valve is in the position shown in Fig. 2.

Above the ram-cylinder 22 there is supported a power-cylinder 32 within which reciprocates a piston 33, the piston-rod 34 of which extends downwardly through a suitable packing-gland and into the upper end of the ram-cylinder 22, being provided with an enlargement or head 35 which travels into and out of an appropriately shaped recess 36 in the upper face of the ram-cylinder. The power-cylinder 32 which is illustrated is of the internal combustion type, operating upon the two-stroke cycle. The cylinder-head carries the usual outlet or exhaust-valve 37 and inlet-valve 38, both of which are designed to be mechanically actuated as will later appear. The cylinder-head also carries a sparker or igniter of the mechanical make-and-break type, designated 39, the movable electrode $39^1$ of which is operated by a third arm 40 (Fig. 7), connected to the usual rocker-arm 41, which actuates the inlet-valve 38. This arm 40 is normally urged in a clock-wise direction, as viewed in Fig. 7, by a coil-spring 42, and has a toe on its lower end adapted to engage an upstanding finger 43 carried by a sliding-block 44, the plunger 45 of which actuates the movable igniter element 39¹. The block 44 operates in one direction against a spring 46, and a spring-pressed pivoted latch or dog 47 is adapted to engage an appropriate shoulder on the block to hold the latter in retracted position against the force of the spring 46. The latch 47 carries an upstanding lug which is adapted to be engaged by an adjustable screw 48 threaded into the lower end of the arm 40. By this construction the arm 40 acts to move the block 44 to the right, as viewed in Fig. 7, and against the tension of the spring 46 until the latch 47 engages to lock the block in such retracted position. At the end of the return stroke of the arm 40 the screw 48 thereof releases the latch 47, whereby the block 44 is forcibly driven to the left, as viewed in Fig. 7, to operate the movable igniter member 39¹.

The inlet rocker-arm 41 is operable by a push-rod 49, the lower end of which telescopes within a socket 50 pivoted to an intermediate rocker-arm 52. The inner end of the push-rod 49 is cut away, as shown in dotted lines at 51 (Fig. 8), and normally abuts against the face 53 of a rocking member 54 journaled in the socket 50 upon a pintle 55. The rocking member 54 is normally held in the position shown in Fig. 8 by a tension-spring 56 stretched between an arm thereof and an outstanding ear formed on the upper end of the socket 50. The rocking member 54 has an arm 57 thereon which extends horizontally into the path of the depending arm 58 of a bell-crank lever 59, suitably supported from the cylinder 32. The other arm of this lever has a vertical bore through which passes a control-rod 60 having a spring-held collar 61 thereon, which is spaced from the lever 59 by a predetermined amount. The control-rod 60 extends downwardly through suitable guides and rests at its lower end upon an outstanding arm 62, carried by the outer end of the ram 21 (Fig. 6). By this construction the actuation of the push-rod 49, and through it the movement of the igniter and inlet-valve, is dependent upon the position of the ram 21, as will later appear.

Referring again to Fig. 5, the cylinder-head casting has cored therein an intake-conduit 64 intermediate the length of which there is mounted a bushing 65, having an inwardly flaring bore. A liquid fuel nozzle 66 extends upwardly to the approximate center line of the bushing 65 and is controllable by a fuel valve 67. Fuel is supplied to the nozzle 66 from a constant-level chamber 68, the upper portion of which communicates with the conduit 64, as by the bore 69. By this construction air under pressure may be supplied to the conduit 64, this same pressure being imposed upon the surface of the fuel in the chamber 68, the atomization of this fuel to carburet the incoming current of air being secured solely by aspiration from the nozzle 66.

As shown in Fig. 2, the ram-cylinder 22 has a lateral extension 70, into which is tapped an inlet and outlet conduit 71. The flow of fluid into and out of the cylinder through this conduit is controlled by a valve 72, which seats against an inwardly facing seat and is balanced as to the pressure in the conduit 71 by a piston 73 carried by the stem of the valve and operating in a cylinder 74, which has communication with the conduit 71. The outer end of the conduit 71 is connected with the reservoir 75, in which the operating liquid is maintained under pressure, the reservoir or accumulator having a gas space above the liquid level therein so as to form a yielding cushion which resists the expulsion of fluid from the ram-cylinder and forces fluid thereinto in the operation of the machine, as will later appear.

Horizontally journaled in the frame 20 there is a cam-shaft 76 carrying six cams, by the action of which the machine is controlled. Referring to Fig. 3, these cams are designated 77 to 82. The cam 77, which is also shown in Fig. 6, operates through a suitable rocker-arm to drive a push-rod 83 by which the engine exhaust-valve 37 is controlled. The cam 78 operates upon a suitable rocker-arm 84 (Fig. 1) to drive the push-rod 85 by which the intermediate rocking lever 52, which controls the inlet and sparker push-rod 49, is actuated. The cam 79 actuates an arm secured to a shaft 87, which carries two horizontally extending arms 88 (Fig. 9), each connected through a series of springs 89 with the bottom of the ram 21, a casting 21¹ fitted to the bottom of the ram having outwardly extending arms to which the upper ends of the springs 89 are secured. The cam 80 which is centrally mounted on the cam-shaft 76 operates a rocker-arm 90 journaled below the cam-shaft 76 on a shaft 91, and having a bank of tension springs 92 secured to its lower end, by which means the arm is constantly urged into contact with the cam. The upper end of this arm is connected by a straight link 93 with the feed-valve or charge-carrier 30. The cam 81 operates a bell-crank lever 94, which has a horizontally extending arm which engages the anvil-block 27, as shown in Fig. 11. The last cam 82 operates a bell-crank 95 by which the push-rod 96, which controls the ram-cylinder valve 72 is driven.

The cam-shaft 76 is driven through a relatively heavy gear 97 thereon from a motor-shaft 98, which is preferably provided with a flywheel 99, reducing gears 100 being interposed between the motor-shaft and the cam-shaft gear.

The operation of my machine is as follows: The motor-shaft 98 is driven by some suitable motor, and through the latter the cam-shaft 76 will be operated to secure timed movements of the various parts of the press, in the following manner: Assuming that the parts are in the position shown in Fig. 2, that is, with the ram 21 positively held at the upper limit of its stroke by the cam 79, and with the feeding-valve 30 lying over the die 25, the charge of material to be briqueted, as, for instance, iron turnings, borings, or chips, will have fallen by gravity into the die to fill the latter. The ram 21 being still held in its upper position, the feeding-valve will now be retracted to lie beneath the feed-pipe 31. By the movement of the cam 79 the bell-crank 88 will now be permitted to move downwardly, and the ram-cylinder valve 72 being at this time open, the operating fluid supplied to the inlet conduit 71 and constantly maintained therein under a predetermined pressure of, for instance, 100 pounds per square inch, will enter the ram-cylinder to force the ram downwardly and cause the plunger 24 thereof to enter the die 25 and compress the material therein to a considerable extent, the relative areas of the ram-cylinder and its plunger being such that the latter may exert a pressure of upward of 2,000 pounds per square inch upon the material in the die. During all of this time the power piston 33 will have been held at the upper limit of its stroke by the pressure to which the head 35 of its piston-rod is exposed. By the operation of its controlling cam the ram-cylinder valve 72 is now closed, and the power-cylinder inlet-valve 38 is opened to admit carbureted air or other explosive mixture, under pressure, to this cylinder, the cylinder exhaust-valve being at that time closed. By the continued operation of the inlet-valve cam the inlet-valve 38 is closed, and at the instant that such valve reaches its closed position, or a very short interval of time thereafter, the igniter mechanism is operated in the manner before described, to secure the ignition of the charge within the cylinder 32. The exceedingly high pressure which is thereby created within this cylinder drives the piston 33 downward against the resistance which the head 35 of its piston-rod meets within the ram-cylinder 22, and since the ram-cylinder is filled with liquid, the ram 21 moves downwardly to further compress the material in the die 25. After the ram 21 has moved downwardly through a predetermined distance the enlarged head 35 of the piston-rod 34, which head has up to that time operated as a piston, travels out of the recess or bore 36. By this action the effective fluid-displacing area of the piston-rod 34, acting as a plunger within the ram-cylinder 22, changes automatically so that with the same pressure existing in the cylinder 32 a far greater pressure is now exerted within the ram-cylinder 22. This last and highest pressure from the ram 21 effects the final compression of the material within the die 25 to form the finished briquet.

The exhaust valve 37 of the power cylinder is now opened, and, the pressure in the power cylinder being instantly relieved, the pressure in the ram-cylinder also drops to the point required to lift and support the power piston.

The valve 72 of the ram-cylinder is now opened, through its controlling cam, and as this valve opens the cam 79 operates to elevate the ram 21, expelling the liquid from the ram cylinder through the conduit 71 and against the pressure of the fluid cushion in the dome or reservoir 75. Previous to or during the initial upward movement of the ram 21 the piston-rod 34 will have been driven upward, and as it approaches the upper limit of its stroke the enlarged head 35 thereof enters the recess 36, and the liquid trapped above the head within the recess escapes slowly through the extremely small clearance between the head and the walls of the recess. By this construction the head 35 and recess 36 therefore form a dashpot to cushion the upward stroke of the power piston 33. Through the cam 81 the sliding block 27, which has heretofore rested upon the base 20, is elevated to push the anvil 28 upwardly through the die 25, thereby expelling the formed briquet from the die. The feeding-valve 30 is now driven inwardly, carrying with it the charge of material to be briqueted, and in such inward movement pushes the formed briquet off of the top of the die 25, the block 27 being simultaneously lowered to permit the charge of material within the feeding-valve to enter the die. This completes the cycle of operation of the press.

As before described, the rod 60 (Figs. 6 and 7) rests at its lower end upon the horizontally extending arm or boss 62 carried by the lower end of the ram 21. If the initial compression movement of the ram 21 before described is too great, as for instance, in the event that the die 25 has through accident not been filled or has been incompletely filled, this arm or boss 62 will drop below the lower end of the rod 60, and the weight of the latter will now be carried by the collar 61 on the upper end thereof, which will drop into contact with the lever 59. The weight of the rod 60 upon this lever is sufficient to rock the latter in a counter-clockwise direction, as viewed in Fig. 7, and the depending arm 58 thereof engages the horizontally extending arm 57 to rock the pivoted member 54 carried by the socket 50 outwardly out of the path of the end of the push-rod 49. Under such circumstances, therefore, the socket 50 will move freely upward, telescoping over the push-rod 49, instead of operating the latter. No charge will be admitted to the power cylinder 32 under these circumstances, the inlet-valve 38 remaining closed and the igniter 39 failing to operate. By this safety mechanism, therefore, the power cylinder is rendered inoperative save when the mold 25 is filled with a sufficient quantity of material.

One of the greatest advantages of my invention resides in the arrangement by which the ram 21 is operated. As before described, the liquid which enters the ram-cylinder is constantly maintained at a predetermined pressure, as by means of the dome or reservoir 75 containing the fluid-cushion. The ram is forcibly elevated against such pressure by the cam 79, shown in Fig. 9, such elevation of the ram through the distance required to withdraw its plunger from the mold or die 25 and to elevate the plunger a sufficient distance to permit the feeding-valve to operate, requiring a considerable expenditure of power. To supply this power directly from a motor or engine would necessitate the use of an exceedingly powerful motor or engine. By employing the fly-wheel 99, which is so geared down as to turn at a high speed, however, and by the employment of the cam 79, we are able to make use of a relatively small driving motor. The said fly-wheel 99 serves as a reservoir of energy, giving out energy to elevate the ram 21, and absorbing energy in the initial downward movement of the ram under pressure of its operating liquid. The cam 79 and bell-crank 88 act as a reversible power transmission, the cam-shaft driving the bell-crank lever during the upward stroke of the ram and being driven by the bell-crank lever during the downward stroke of the ram, so that there is an alternate flow of power from the fly-wheel 99 to the cam-shaft and back from the cam-shaft to the fly-wheel, this same alternate flow of power taking place between the ram 21 and the fluid-cushion in the reservoir 75. In effect, therefore, the flywheel 99 and fluid-cushion form two reservoirs of power which discharge into one another alternately, the liquid column, ram, bell-crank and cam constituting a reversible transmission by which this flow of power in one direction and then in the other takes place.

As a result of this arrangement of the parts last described we find it possible to employ a relatively small driving motor for the flywheel 99, the relatively long travel of the ram under high pressures being attained without the sacrifice of energy, other than the energy lost in friction.

While I have shown and described in considerable detail one specific embodiment of my invention, it is to be understood that this is illustrative only and for the purpose of making clear the nature and objects of the invention, and that the invention is not to be regarded as limited to the specific construction illustrated and described nor to any of the details thereof, except in so far as such limitations are included within the terms of the following claims, in which it is my intention to claim all novelty inherent in my invention as broadly as is permissible in view of the prior art.

What I claim as new and desire to secure by Letters Patent is:

1. In a press, a die, a plunger movable into and out of the die, a charge-carrier journaled between the die and the plunger in the outward position of the latter, fluid-pressure means for applying power to the plunger to drive it inwardly into the die, an elastic cushion for resisting the displacement of fluid in the said means during the outward stroke of the plunger, a power transmission apparatus for forcing the plunger outward against the resistance of the said cushion, and a reservoir of power for actuating the said transmission, whereby the power consumed in forcing the plunger outwardly is stored by the said cushion and returned to the reservoir during the inward stroke of the plunger.

2. In a press, a die, a plunger movable into and out of the die, a charge-carrier traveling between the die and the plunger in the outward position of the latter, a ram for applying power to the plunger to drive it inwardly into the die, an elastic cushion for resisting the displacement of fluid by the said ram during the outward stroke of the plunger, a power transmission apparatus for forcing the ram outward against the resistance of the said cushion, a reservoir of power for actuating the said transmission whereby the power consumed in forcing the plunger outwardly is stored by the said cushion and returned to the reservoir during the inward stroke of the plunger, and means independent of the said cushion for intensifying the fluid-pressure on the said ram during the inward stroke of the latter.

3. In a press, a die, a plunger movable into and out of the die, a charge-carrier traveling between the die and the plunger in the outward position of the latter, fluid-pressure means for applying power to the plunger to drive it inwardly, an elastic cushion for resisting the displacement of fluid in the said means during the outward stroke of the plunger, a power transmission apparatus for forcing the plunger outward against the resistance of the said cushion, a reservoir of power for actuating the said transmission, whereby the power consumed in forcing the plunger outward is stored by the said cushion and returned to the reservoir during the inward stroke of the plunger, a reciprocating member for displacing the fluid operating the said plunger, and independent means for applying power to said reciprocating member during the inward stroke of the plunger to increase the operative pressure upon the latter.

4. In a press, a die, a plunger movable into and out of the die, a charge-carrier traveling between the die and the plunger in the outward position of the latter, a fluid-pressure-actuated ram connected with the said plunger, an elastic cushion for resisting the displacement of fluid in the ram-cylinder during the outward stroke of the plunger, a power transmission apparatus for forcing the plunger outwardly against the resistance of the said cushion, a reservoir of mechanical energy for actuating the said transmission, a power cylinder and a fluid plunger operated thereby and traveling into and out of the said ram-cylinder.

5. In a press, a die adapted to hold the material to be acted upon, a plunger movable into and out of the die, fluid-pressure means for forcing the said plunger into the die, means for intensifying the actuating pressure of the plunger, and means governed by the motion of the ram under the pressure of the first-named means for controlling the operation of said pressure-intensifier.

6. In a press, a die, adapted to hold the material to be acted upon, a plunger movable into and out of the die, fluid-pressure means for forcing the said plunger into the die, independently operable means for intensifying the actuating pressure of the plunger, and a control device for said intensifier actuatable by over-travel of said plunger under the force of said first-named fluid-pressure means.

7. In a press, a die adapted to hold the material to be acted upon, a plunger movable into and out of the die, fluid-pressure means for forcing the said plunger into the die, an independently actuated fluid-displacing plunger for intensifying the actuating pressure on the said die-plunger, means for driving said fluid-displacing plunger, and means governed by the motion of the die-plunger under the pressure of the first-named fluid-pressure means for preventing or permitting the operation of said fluid-displacing plunger.

8. In a press, a die adapted to hold the material to be acted upon, a plunger movable into and out of the die, fluid-pressure means for forcing the said plunger into the die, a fluid-displacing plunger for intensifying the actuating pressure of the said plunger, an internal-combustion engine for driving the said fluid-displacing plunger, and means governed by the motion of the die-plunger under the pressure of the said first-named fluid-pressure means for regulating the operation of said internal-combustion engine.

9. In a press, a die adapted to hold the material to be acted upon, a plunger movable into and out of the die, fluid-pressure means for forcing the said plunger into the die, an internal combustion engine, driving means for intensifying the actuating pressure of the plunger, and means governed by the motion of the plunger under the pressure of the said first-named fluid-pressure means for controlling the valve mechanism of said internal-combustion engine.

10. In a press, a die adapted to hold the material to be acted upon, a plunger movable into and out of the die, fluid-pressure means for forcing the said plunger into the die, an internal-combustion engine, driving means for intensifying the actuating pressure of the plunger, and means governed by the motion of the plunger under the pressure of the said first-named fluid-pressure means for controlling the valve and igniter mechanism of the said internal-combustion engine.

11. In a press, a ram-cylinder and a ram movable therein, a fluid-displacing plunger movable into and out of the ram-cylinder, and an enlargement carried by the inner end of the plunger and adapted to travel into a mating recess in the inner face of the ram-cylinder at the outer limit of the stroke of the plunger.

12. In a press, a ram-cylinder and a ram movable therein, a power-cylinder and a piston movable therein, a fluid-displacing plunger connected with the said power-piston and movable into and out of the ram-cylinder, and an enlargement carried by the inner end of the plunger and adapted to travel into a mating recess on the inner face of the ram-cylinder at the outer limit of the stroke of the plunger.

13. In a press, a ram-cylinder and a ram movable therein, a power-cylinder, and a piston movable therein, a piston-rod for the said piston entering the said ram-cylinder to serve as a fluid-displacing plunger therein, and an enlargement carried by the end of the piston-rod and adapted to travel into a mating recess in the inner face of the ram-cylinder at the limit of the stroke of the said power-piston.

14. In a press, a ram-cylinder and a ram movable therein, an internal-combustion engine cylinder, a single-acting piston movable therein, a piston-rod for the said piston traveling into the said ram-cylinder to serve as a fluid-displacing plunger therein, and an enlargement carried by the end of the piston-rod and adapted to travel into a mating recess in the inner face of the ram-cylinder at the inner limit of stroke of the internal-combustion engine piston.

15. In a press, a frame, a die carried by the frame, a ram-cylinder carried by the frame opposite the said die, a ram movable in the said cylinder and having a plunger adapted to enter and draw out of the die, a power-cylinder carried by the frame, a plunger operated thereby and traveling into and out of the ram-cylinder, an independent driving-motor and means actuated by the said motor for feeding material to the said die, for controlling the movement of the said ram, and for timing the operation of said power-cylinder.

16. In a press, a frame, a die carried thereby, a ram-cylinder supported above the die, a ram operable in the cylinder and having a plunger thereon adapted to travel into and out of the die, a charge-carrier traveling horizontally between the die and the plunger in the upper position of the latter, an internal-combustion engine cylinder carried by the frame, a piston therein, a plunger connected with said internal-combustion engine piston and traveling into and out of the ram-cylinder, and independent motor-driven means for timing the operation of said internal-combustion engine.

17. In a press, a frame, a die carried by the frame, a ram-cylinder carried by the frame opposite the die, a ram movable therein and carrying a plunger for coöperation with the said die, an internal-combustion engine cylinder carried by the said frame, a piston traveling therein, a plunger connected with the piston and operating in the ram-cylinder, a charge-carrier for feeding material to the said die, a cam-shaft mounted in the frame, an independent motor for driving the said cam-shaft, and means coöperating with cams on said shaft for timing the movements of the said internal-combustion engine piston, the ram, and the charge-carrier.

18. In a press, a frame, a tubular die carried thereby, a movable anvil closing one end of the said die and adapted to travel into and out of the latter, means for driving the said anvil through the die, means for supporting said anvil directly upon said frame in its outer position, a compression-plunger mounted to travel into and out of the opposite end of the said die, and means for driving said plunger.

OTHO C. DURYEA.